US011515721B2

(12) United States Patent
Chen et al.

(10) Patent No.: US 11,515,721 B2
(45) Date of Patent: Nov. 29, 2022

(54) DUAL-SLOPE OPTICAL SENSOR

(71) Applicant: ANPEC ELECTRONICS CORPORATION, Hsinchu (TW)

(72) Inventors: Jing-Min Chen, Hsinchu (TW); Jia-Hua Hong, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 238 days.

(21) Appl. No.: 17/123,247

(22) Filed: Dec. 16, 2020

(65) Prior Publication Data

US 2022/0094193 A1 Mar. 24, 2022

(30) Foreign Application Priority Data

Sep. 18, 2020 (TW) ................................ 109132225

(51) Int. Cl.
*H02J 7/34* (2006.01)
*H02J 7/35* (2006.01)
*H02J 7/00* (2006.01)

(52) U.S. Cl.
CPC ............ *H02J 7/345* (2013.01); *H02J 7/0068* (2013.01); *H02J 7/35* (2013.01); *H02J 2207/50* (2020.01)

(58) Field of Classification Search
CPC .......... H02J 2207/50; H02J 7/35; H02J 7/345; H02J 7/0068; H02J 7/0013
USPC ........................................... 250/340; 320/101
See application file for complete search history.

(56) References Cited

U.S. PATENT DOCUMENTS

| 11,022,487 B2 * | 6/2021 | Greimel-Rechling .... G01J 1/18 |
| 2015/0102209 A1 * | 4/2015 | Xu ............................. G01J 1/46 |
| | | 250/214 LA |
| 2016/0079447 A1 * | 3/2016 | Kriebernegg ............ G01V 8/10 |
| | | 250/214 AL |

* cited by examiner

*Primary Examiner* — Richard Isla
*Assistant Examiner* — Sadia Kousar
(74) *Attorney, Agent, or Firm* — Li & Cai Intellectual Property (USA) Office

(57) ABSTRACT

A dual-slope optical sensor is provided. Two terminals of a first charging switch are respectively connected to an optoelectronic component and a first terminal of a capacitor. Two terminals of a second charging switch are respectively connected to a second terminal of the capacitor and grounded. First terminals of third charging and discharging switches are respectively connected to the first and second terminals of the capacitor. First terminals of fourth charging and discharging switches are respectively coupled to first and second reference voltages. Two terminals of a first discharging switch are respectively connected to the optoelectronic component and the second terminal of the capacitor. A first input terminal of a comparator is connected to second terminals of the third charging switch and the fourth discharging switch. A second input terminal of the comparator is connected to second terminals of the fourth charging switch and the third discharging switch.

10 Claims, 3 Drawing Sheets

DUAL-SLOPE OPTICAL SENSOR

CROSS-REFERENCE TO RELATED PATENT APPLICATION

This application claims the benefit of priority to Taiwan Patent Application No. 109132225, filed on Sep. 18, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical sensor, and more particularly to a dual-slope optical sensor.

BACKGROUND OF THE DISCLOSURE

A transistor such as an n-type metal oxide semiconductor (NMOS) transistor, a p-type metal oxide semiconductor (PMOS) transistor, etc., needs to be disposed in a conventional optical sensor. A first terminal of the transistor is connected to an input terminal of a comparator of the conventional optical sensor. A control terminal of the transistor is connected to an input terminal of the comparator. A second terminal of the transistor is grounded.

When an external light source continuously emits light to illuminate the conventional optical sensor, an optoelectronic component of the conventional optical sensor converts energy of the light into a photocurrent for charging a capacitor. The comparator compares a voltage of the capacitor and a reference voltage multiple times during a process of charging the capacitor. Each time the comparator compares the voltage of the capacitor with the reference voltage, the comparator outputs one bit value of a comparison signal to a counter for counting. Then, the transistor directly pulls down the voltage of an input terminal of the comparator to zero during a pull-down delay time to reset the voltage of the input terminal of the comparator, according to a level of the comparison signal, which results in an unstable current in the conventional optical sensor.

When the photocurrent is large, a long pull-down delay time is required for resetting the voltage of the input terminal of the comparator multiple times. As a result, a value counted by the counter may exhibit significant error.

SUMMARY OF THE DISCLOSURE

In response to the above-referenced technical inadequacies, the present disclosure provides a dual-slope optical sensor. The dual-slope optical sensor includes an optoelectronic component, a capacitor, a charging switch circuit, a discharging switch circuit, a comparator, and a controller circuit. The optoelectronic component is configured to convert light energy irradiated through the optoelectronic component into a photocurrent. The charging switch circuit includes a first charging switch, a second charging switch, a third charging switch and a fourth charging switch. A first terminal of the first charging switch is connected to the optoelectronic component. A second terminal of the first charging switch is connected to a first terminal of the capacitor. A first terminal of the second charging switch is connected to a second terminal of the capacitor, and the second terminal of the second charging switch is grounded. A first terminal of the third charging switch is connected to the first terminal of the capacitor. A first terminal of the fourth charging switch is coupled to a first reference voltage. The discharging switch circuit includes a first discharging switch, a second discharging switch, a third discharging switch and a fourth discharging switch. A first terminal of the first discharging switch is connected to the optoelectronic component, and a second terminal of the first discharging switch is connected to the second terminal of the capacitor. A first terminal of the second discharging switch is connected to the first terminal of the capacitor, and a second terminal of the second discharging switch is grounded. A first terminal of the third discharging switch is connected to the second terminal of the capacitor. A first terminal of the fourth discharging switch is coupled to a second reference voltage. A first comparison input terminal of the comparator is connected to a second terminal of the third charging switch and a second terminal of the fourth discharging switch. A second comparison input terminal of the comparator is connected to a second terminal of the fourth charging switch and a second terminal of the third discharging switch. The comparator is configured to compare a voltage of the first comparison input terminal of the comparator with a voltage of the second comparison input terminal of the comparator to output a comparison signal. The controller circuit is connected to an output terminal of the comparator, the charging switch circuit and the discharging switch circuit. The controller circuit is configured to receive the comparison signal from the comparator and then output the comparison signal. The controller circuit is configured to output a control signal for controlling the charging switch circuit and the discharging switch circuit according to the comparison signal.

In certain embodiments, the first comparison input terminal of the comparator is a non-inverting terminal, and the second comparison input terminal of the comparator is an inverting terminal.

In certain embodiments, when the controller circuit turns on the charging switch circuit and turns off the discharging switch circuit, the photocurrent flows to the capacitor through the first charging switch to charge a voltage of the capacitor to an initial voltage.

In certain embodiments, the initial voltage is higher than a zero value and slightly lower than the second reference voltage.

In certain embodiments, when the photocurrent charges the capacitor such that the voltage of the capacitor is increased from the initial voltage to the first reference voltage, the controller circuit turns off the charging switch circuit and turns on the discharging switch circuit according to the comparison signal at a high level from the comparator.

In certain embodiments, when the controller circuit turns off the charging switch circuit and turns on the discharging switch circuit, the photocurrent flows to the capacitor through the first discharging switch such that the voltage of the capacitor gradually is decreased.

In certain embodiments, when the voltage of the capacitor is decreased to reach the second reference voltage, the controller circuit turns on the charging switch circuit and turns off the discharging switch circuit.

In certain embodiments, the dual-slope optical sensor further includes a current mirror. An input terminal of the current mirror is connected to the optoelectronic component. An output terminal of the current mirror is connected to the first terminal of the first charging switch and the first terminal of the first discharging switch.

In certain embodiments, the current mirror includes a first transistor and a second transistor. A first terminal of the first transistor and a first terminal of the second transistor are coupled to a common voltage. A second terminal of the first transistor is connected to a control terminal of the first transistor, a control terminal of the second transistor and a first terminal of the optoelectronic component. A second terminal of the optoelectronic component is grounded. A second terminal of the second transistor is connected to the first terminal of the first charging switch and the first terminal of the first discharging switch.

In certain embodiments, the dual-slope optical sensor further includes a current source connected to the output terminal of the current mirror and grounded.

As described above, the present disclosure provides the dual-slope optical sensor, in which the charging switch circuit and the discharging switch circuit are disposed, instead of an NMOS transistor or a PMOS transistor that is disposed in the conventional optical sensor. Furthermore, the capacitor of the dual-slope optical sensor of the present disclosure is charged or discharged by the photocurrent supplied from the optoelectronic component, and this operation is not performed in the conventional optical sensor. Before the capacitor of the dual-slope optical sensor of the present disclosure is continuously charged, the voltage of the capacitor is charged to an initial voltage that is higher than the zero value in advance, thereby preventing the current of the dual-slope optical sensor from becoming unstable.

A reset delay time is required for the conventional optical sensor, but not the dual-slope optical sensor of the present disclosure. Therefore, a sensing efficiency and a curve linearity of the dual-slope optical sensor of the present disclosure are better than that of the conventional optical sensor. The values sensed by the dual-slope optical sensor of the present disclosure is hence more accurate than that of the conventional optical sensor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
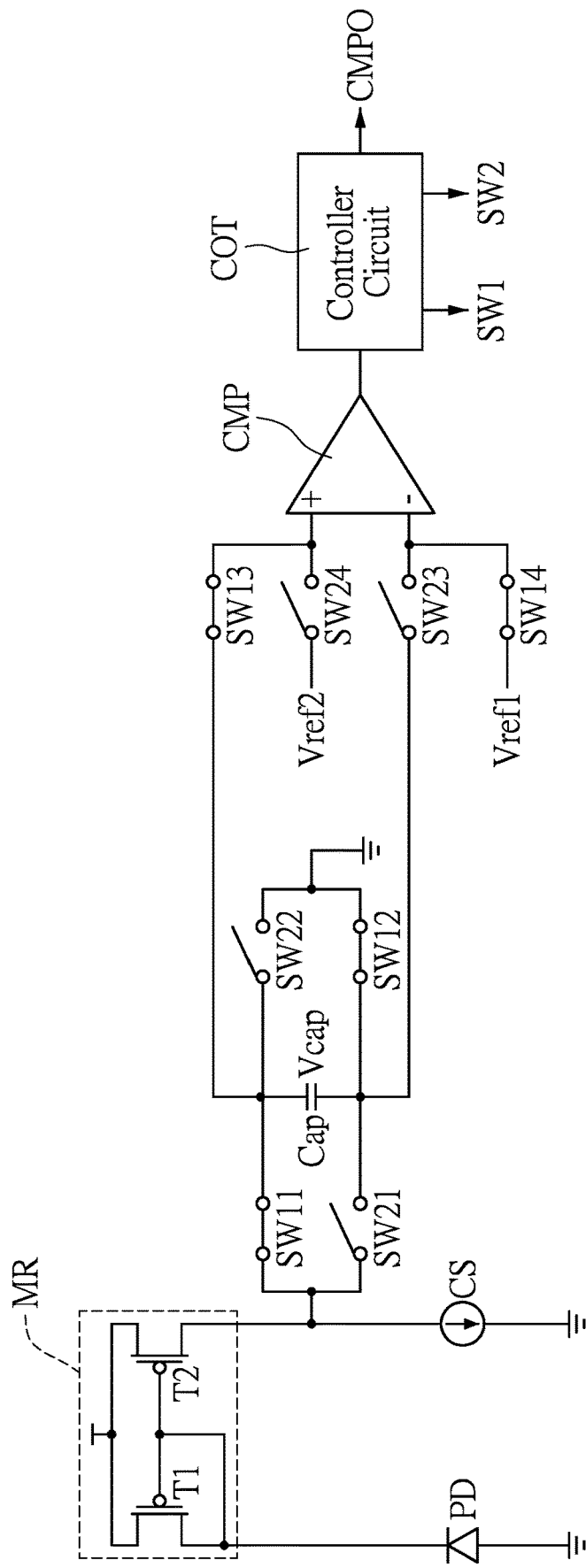
FIG. 1 is a circuit layout diagram of a dual-slope optical sensor in a charging mode according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
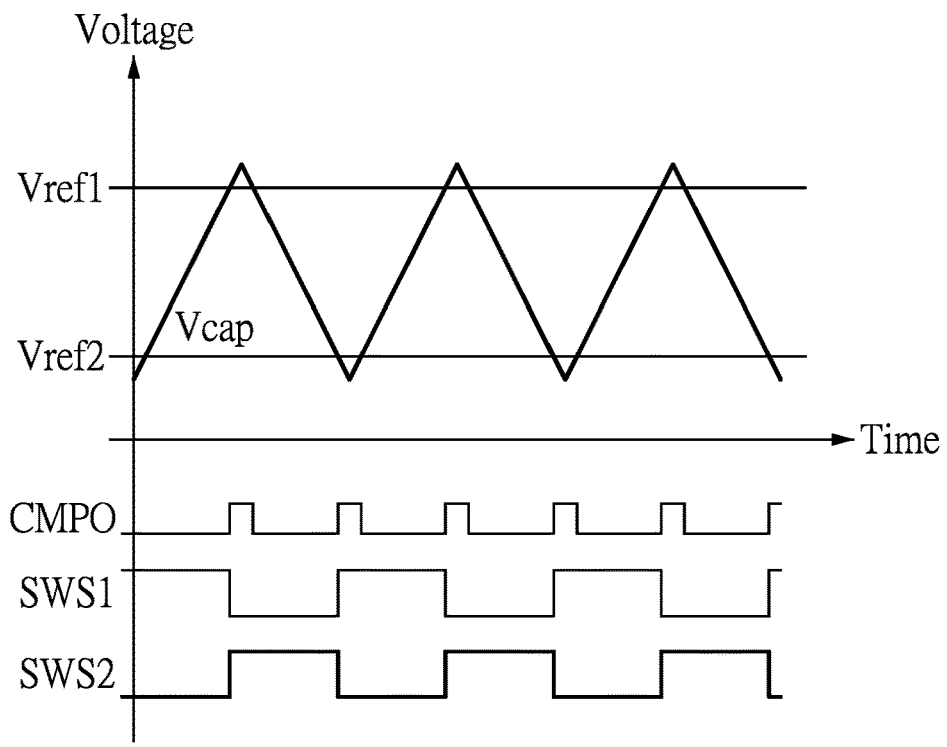
FIG. 3 is a waveform diagram of signals of the dual-slope optical sensor according to the embodiment of the present disclosure.

Reference is made to FIGS. 1 and 3, wherein FIG. 1 is a circuit layout diagram of a dual-slope optical sensor in a charging mode according to an embodiment of the present disclosure, and FIG. 3 is a waveform diagram of signals of the dual-slope optical sensor according to the embodiment of the present disclosure.

As shown in FIG. 1, the dual-slope optical sensor of the embodiment of the present disclosure may include an optoelectronic component PD, a capacitor Cap, a charging switch circuit SW1, a discharging switch circuit SW2, a comparator CMP and a controller circuit COT.

The charging switch circuit SW1 may include a first charging switch SW11, a second charging switch SW12, a third charging switch SW13 and a fourth charging switch SW14. On the other hand, the discharging switch circuit SW2 may include a first discharging switch SW21, a second discharging switch SW22, a third discharging switch SW23, and a fourth discharging switch SW24.

It is worth noting that, a first terminal of the first charging switch SW11 of the charging switch circuit SW1 may be connected to a first terminal such as a negative terminal of the optoelectronic component PD. A second terminal of the first charging switch SW11 of the charging switch circuit SW1 may be connected to a first terminal of the capacitor Cap. A second terminal such as a positive terminal of the optoelectronic component PD may be grounded.

If necessary, the dual-slope optical sensor of the embodiment of the present disclosure may further include a current mirror MR. An input terminal of the current mirror MR can be connected to the first terminal such as the negative terminal of the optoelectronic component PD. An output terminal of the current mirror MR may be connected to the first terminal of the first charging switch SW11.

In detail, the current mirror MR may include a first transistor T1 and a second transistor T2. A first terminal of the first transistor T1 and a first terminal of the second transistor T2 may be coupled to a common voltage. That is, the first terminal of the first transistor T1 and the first terminal of the second transistor T2 may be connected to a common power source and receive the common voltage (or a common current, in practice) from the common power source. A second terminal of the first transistor T1 may be connected to a control terminal of the first transistor T1, a control terminal of the second transistor T2 and the first terminal such as the negative terminal of the optoelectronic component PD. A second terminal of the second transistor T2 may be connected to the first terminal of the first charging switch SW11 and a first terminal of the first discharging switch SW21.

It is worth noting that, a first terminal of the second charging switch SW12 may be connected to a second terminal of the capacitor Cap. A second terminal of the second charging switch SW12 is grounded. A first terminal of the third charging switch SW13 may be connected to the first terminal of the capacitor Cap. A first terminal of the fourth charging switch SW14 may be coupled to a first reference voltage Vref1.

On the other hand, the first terminal of the first discharging switch SW21 of the discharging switch circuit SW2 may be connected to the output terminal of the current mirror MR that is the second terminal of the second transistor T2. If necessary, the dual-slope optical sensor of the embodiment of the present disclosure may further include a current source CS for supplying an auxiliary current. A first terminal of the current source CS is connected to the second terminal of the second transistor T2 of the current mirror MR, and a second terminal of the current source CS is grounded.

A second terminal of the first discharging switch SW21 may be connected to the second terminal of the capacitor Cap. A first terminal of the second discharging switch SW22 may be connected to the first terminal of the capacitor Cap. A second terminal of the second discharging switch SW22 is grounded. A first terminal of the third discharging switch SW23 may be connected to the second terminal of the capacitor Cap. A first terminal of the fourth discharging switch SW24 may be coupled to a second reference voltage Vref2.

Further, a first comparison input terminal such as a non-inverting input terminal of the comparator CMP may be connected to a second terminal of the third charging switch SW13 and a second terminal of the fourth discharging switch SW24. A second comparison input terminal such as an inverting input terminal of the comparator CMP may be connected to a second terminal of the fourth charging switch SW14 and a second terminal of the third discharging switch SW23.

The controller circuit COT may be connected to an output terminal of the comparator CMP, a control terminal of each of the first charging switch SW11, the second charging switch SW12, the third charging switch SW13 and the fourth charging switch SW14 of the charging switch circuit SW1. In addition, the controller circuit COT may be connected to a control terminal of each of the first discharging switch SW21, the second discharging switch SW22, the third discharging switch SW23 and the fourth discharging switch SW24 of the discharging switch circuit SW2.

The controller circuit COT may transmit a comparison signal CMPO to an external circuit from the comparator CMP, and may output a control signal for controlling the charging switch circuit SW1 and the discharging switch circuit SW2 according to the comparison signal CMPO.

In detail, in the charging mode shown in FIG. 1, the controller circuit COT turns on the charging switch circuit SW1. That is, the controller circuit COT turns on the first charging switch SW11, the second charging switch SW12, the third charging switch SW13, and the fourth charging switch SW14. In addition, in the charging mode shown in FIG. 1, the controller circuit COT turns off the discharging switch circuit SW2. That is, the controller circuit COT turns off the first discharging switch SW21, the second discharging switch SW22, the third discharging switch SW23 and the fourth discharging switch SW24.

The optoelectronic component PD is configured to convert light energy irradiated through the optoelectronic component PD into a photocurrent. The photocurrent flows through the current mirror MR. When the photocurrent flows through the current mirror MR, the photocurrent may be amplified by a certain ratio. Then, the photocurrent flows to the capacitor Cap through the first charging switch SW11 from the current mirror MR to charge the capacitor Cap such that a voltage Vcap of the capacitor Cap is increased.

It is worth noting that, as shown in FIG. 3, the photocurrent of the optoelectronic component PD charges the voltage Vcap of the capacitor Cap (from zero voltage) to an initial voltage that is higher than a zero value and slightly lower than the second reference voltage Vref2. After the voltage Vcap of the capacitor Cap is charged to the initial voltage (from the zero value), the capacitor Cap is continually charged by the photocurrent of the optoelectronic component PD such that a rising/charging segment of a first waveform of a signal of the voltage Vcap of the capacitor Cap is generated as shown in FIG. 3.

When the charging switch circuit SW1 shown in FIG. 1 is turned on, the third charging switch SW13 allows the first comparison input terminal such as the non-inverting input terminal of the comparator CMP to obtain the voltage Vcap of the capacitor Cap. At this time, the second comparison input terminal such as the inverting input terminal of the comparator CMP is coupled to the first reference voltage Vref1 through the fourth charging switch SW14 and obtains the first reference voltage Vref1.

As described above, in the embodiment, the first comparison input terminal of the comparator CMP is exemplified as the non-inverting input terminal, and the second comparison input terminal of the comparator CMP is exemplified as the inverting input terminal, but the present disclosure is not limited thereto.

When the comparator CMP determines that a voltage of the first comparison input terminal of the comparator CMP (that is, the voltage Vcap of the capacitor Cap) does not reach a voltage of the second comparison input terminal of the comparator CMP (that is, the first reference voltage Vref1), the comparator CMP outputs the comparison signal CMPO at a low level shown in FIG. 3. The controller circuit COT continuously turns on the charging switch circuit SW1 and turns off the discharging switch circuit SW2 according to the comparison signal CMPO at the low level.

When the capacitor Cap is being charged by the photocurrent of the optoelectronic element PD shown in FIG. 1 in the charging mode, a charging switch signal SWS1 shown in FIG. 3 is at a high level that is aligned with the rising/charging segment of each of waveforms of signal of the voltage Vcap of the capacitor Cap. The charging switch signal SWS1 at the high level represents that the charging switch circuit SW1 shown in FIG. 1 is turned on. At this time, a discharging switch signal SWS2 is at a low level, which represents that the discharging switch circuit SW2 is turned off.

Figure 2:
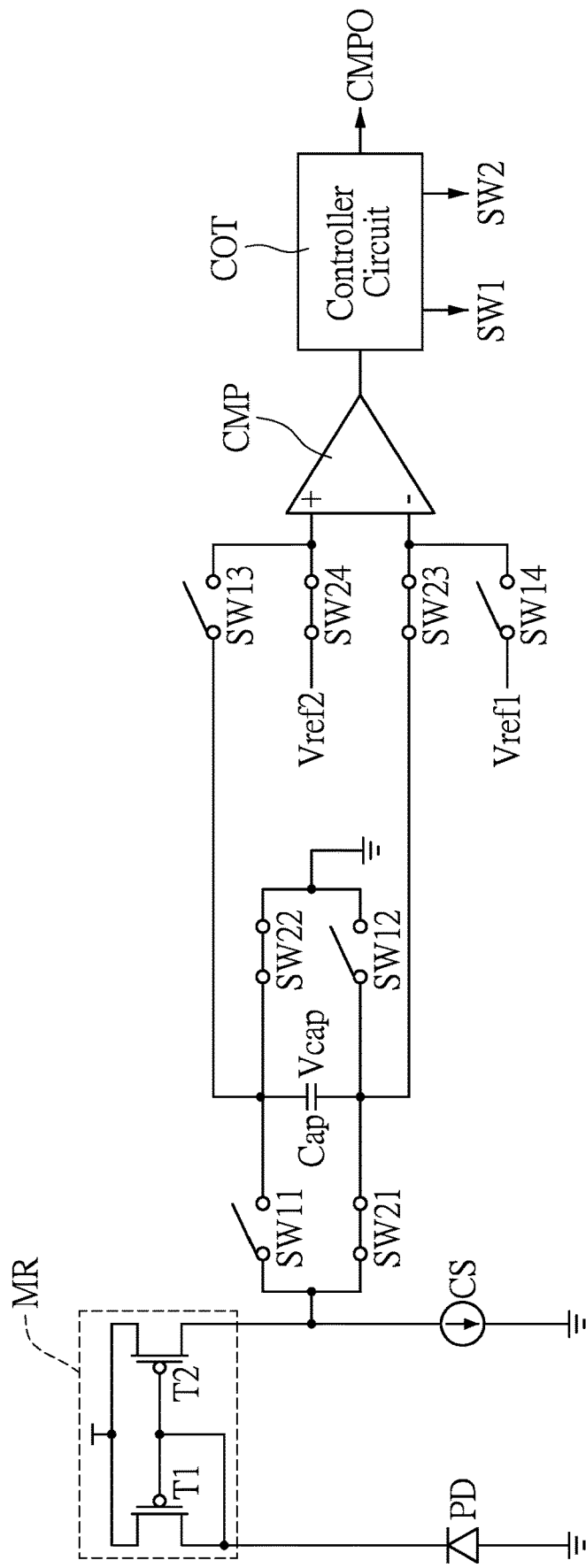
FIG. 2 is a circuit layout diagram of the dual-slope optical sensor in a discharging mode according to the embodiment of the present disclosure.

Reference is made to FIGS. 1 to 3, wherein FIG. 1 is the circuit layout diagram of a dual-slope optical sensor in a charging mode according to an embodiment of the present disclosure, FIG. 2 is a circuit layout diagram of the dual-slope optical sensor in a discharging mode according to the embodiment of the present disclosure, and FIG. 3 is a waveform diagram of signals of the dual-slope optical sensor according to the embodiment of the present disclosure. The descriptions of the same circuit configurations of FIGS. 1 and 2 are not repeated herein.

When the voltage of the first comparison input terminal of the comparator CMP (that is, the voltage Vcap of the capacitor Cap) is charged to reach the voltage of the second comparison input terminal of the comparator CMP (that is, the first reference voltage Vref1), the controller circuit COT switches the charging switch circuit SW1 and the discharging switch circuit SW2 according to the comparison signal CMPO at a high level from the comparator CMP.

In detail, in the discharging mode, as shown in FIG. 2, the controller circuit COT turns off the first charging switch SW11, the second charging switch SW12, the third charging switch SW13 and the fourth charging switch SW14, according to the comparison signal CMPO at the high level. In addition, in the discharging mode, the controller circuit COT turns on the first discharging switch SW21, the second discharging switch SW22, the third discharging switch SW23 and the fourth discharging switch SW24, according to the comparison signal CMPO at the high level.

As shown in FIG. 3, in the discharging mode, the charging switch signal SWS1 is at a low level that is aligned with a falling/discharging segment of each of the waveforms of signal of the voltage Vcap of the capacitor Cap. The charging switch signal SWS1 at the low level represents that the charging switch circuit SW1 shown in FIG. 2 is turned off. At this time, the discharging switch signal SWS2 is at a high level, which represents that the discharging switch circuit SW2 shown in FIG. 2 is turned on.

As shown in FIG. 2, when the discharging switch circuit SW2 is turned on, the first comparison input terminal such as the non-inverting input terminal of the comparator CMP is allowed to be coupled to the second reference voltage Vref2 through the fourth discharging switch SW24 and obtains the second reference voltage Vref2. At this time, the second comparison input terminal such as the inverting input terminal of the comparator CMP is allowed to obtain the voltage Vcap of the capacitor Cap through the third discharging switch SW23 and the second discharging switch SW22.

In the discharging mode, as shown in FIG. 2, the charging switch circuit SW1 is turned off and the discharging switch circuit SW2 is turned on. As a result, the photocurrent of the optoelectronic component PD flows to the capacitor Cap sequentially through the current mirror MR and the first discharging switch SW21. The voltage Vcap of the capacitor Cap gradually is decreased during a process of discharging the capacitor Cap. As shown in FIG. 3, the falling/discharging segment of a first waveform of the waveforms of the signal of the voltage Vcap of the capacitor Cap is generated.

As shown in FIG. 3, when the voltage Vcap of the capacitor Cap is decreased to reach the second reference voltage Vref2 (that is, is decreased to be a voltage that is equal to or less than the second reference voltage Vref2), the comparator CMP outputs the comparison signal CMPO at the high level. The controller circuit COT turns on the charging switch circuit SW1 and turns off the discharging switch circuit SW2 according to the comparison signal CMPO at the high level. As shown in FIG. 3, when the charging switch signal SWS1 rises to the high level from the low level and the discharging switch signal SWS2 falls to the low level from the high level again, the capacitor Cap is switched from the discharging mode back to the charging mode such that a rising/charging waveform of a second waveform of the waveforms of the signal of the voltage Vcap of the capacitor Cap is generated.

It is worth noting that, as shown in FIG. 3, the voltage Vcap of the capacitor Cap is decreased to be a voltage that is not lower than the initial voltage, and the initial voltage is higher than the zero value and slightly lower than the second reference voltage Vref2. As a result, when the capacitor Cap is charged next time, the voltage Vcap of the capacitor Cap is increased from the initial voltage.

Figure 4:
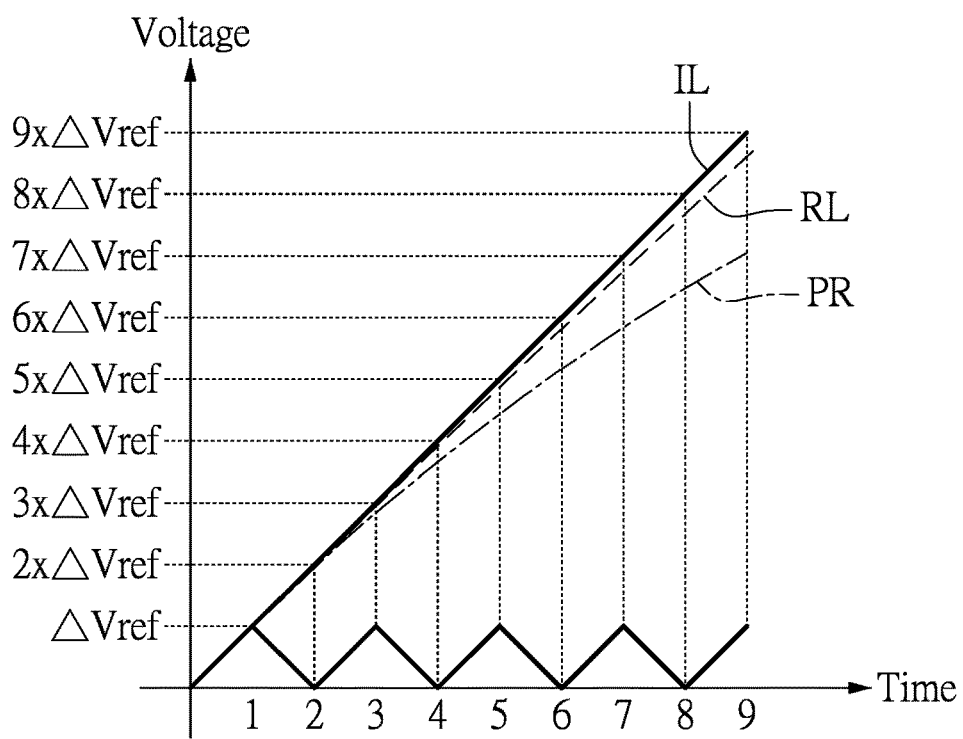
FIG. 4 is a schematic diagram of curves of the number of times that a comparator of the dual-slope optical sensor and the number of times that a comparator of an ideal optical sensor compare voltages versus time according to the embodiment of the present disclosure.

Reference is made to FIGS. 1 to 4, wherein FIG. 4 is a schematic diagram of curves of the number of times that a comparator of the dual-slope optical sensor and the number of times that a comparator of an ideal optical sensor compare voltages versus time according to the embodiment of the present disclosure.

When an external light source continuously illuminates the dual-slope optical sensor, the optoelectronic component PD of the dual-slope optical sensor continuously supplies the photocurrent such that the capacitor Cap shown in FIG. 1 is charged and discharged repeatedly as mentioned above. As a result, as shown in FIG. 3, the waveforms of the signal of the voltage Vcap of the capacitor Cap are sequentially generated and each of the waveforms has the rising/charging segment and the falling/discharging segment.

As shown in FIG. 1, each time the capacitor Cap is charged, the comparator CMP compares the voltage Vcap of the capacitor Cap with the first reference voltage Vref1. As shown in FIG. 2, each time the capacitor Cap is discharged, the comparator CMP compares the voltage Vcap of the capacitor Cap with the second reference voltage Vref2.

After the comparator CMP compares the voltage Vcap with the first reference voltage Vref1 or the second reference voltage Vref2 multiple times, the comparator CMP outputs the comparison signal CMPO having a plurality of bit values each of which may be a high level or a low level. For example, as shown in FIG. 4, the voltage Vcap is compared with the first reference voltage Vref1 or the second reference voltage Vref2 nine times, but the present disclosure is not limited thereto. The bit values of the comparison signal CMPO may be provided to the external circuit such as a counter. The bit values may be used as a basis for determining a light intensity and a distance between an object and an electronic device in which the dual-slope optical sensor is disposed, but the present disclosure is not limited thereto.

As shown in FIG. 4, an optimized ideal curve IL represents a curve of voltages compared by a comparator of an optimized ideal optical sensor versus time, and a measured real curve RL represents a curve of voltages compared by the comparator of the dual-slope optical sensor according to the embodiment of the present disclosure versus time.

A non-ideal curve PR of a conventional optical sensor shifts far from the ideal curve ideal IL and is a nonlinear and non-ideal curve, especially when a large current is supplied to the capacitor Cap. In contrast, the real curve RL of the dual-slope optical sensor of the present disclosure is approximate to the optimized ideal curve IL and has high linearity. Therefore, values sensed by the dual-slope optical sensor of the present disclosure is more accurate than that of the conventional optical sensor.

In summary, the present disclosure provides the dual-slope optical sensor, in which the charging switch circuit and the discharging switch circuit are disposed, instead of an NMOS transistor or a PMOS transistor that is disposed in the conventional optical sensor. Furthermore, the capacitor of the dual-slope optical sensor of the present disclosure is charged or discharged by the photocurrent supplied from the optoelectronic component; however, this operation is not performed in the conventional optical sensor. Before the capacitor of the dual-slope optical sensor of the present disclosure is continuously charged, the voltage of the capacitor is first charged to an initial voltage that is higher than the zero value, thereby preventing the current of the dual-slope optical sensor from becoming unstable.

A reset delay time is required for the conventional optical sensor, but not the dual-slope optical sensor of the present disclosure. Therefore, a sensing efficiency and a curve linearity of the dual-slope optical sensor of the present disclosure are better than that of the conventional optical sensor. The values sensed by the dual-slope optical sensor of the present disclosure is hence more accurate than that of the conventional optical sensor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual-slope optical sensor, comprising:
an optoelectronic component configured to convert light energy irradiated through the optoelectronic component into a photocurrent;
a capacitor;
a charging switch circuit, including:
a first charging switch, wherein a first terminal of the first charging switch is connected to the optoelectronic component, and a second terminal of the first charging switch is connected to a first terminal of the capacitor;
a second charging switch, wherein a first terminal of the second charging switch is connected to a second terminal of the capacitor, and a second terminal of the second charging switch is grounded;
a third charging switch, wherein a first terminal of the third charging switch is connected to the first terminal of the capacitor; and
a fourth charging switch, wherein a first terminal of the fourth charging switch is coupled to a first reference voltage;
a discharging switch circuit, including:
a first discharging switch, wherein a first terminal of the first discharging switch is connected to the optoelectronic component and a second terminal of the first discharging switch is connected to the second terminal of the capacitor;
a second discharging switch, wherein a first terminal of the second discharging switch is connected to the first terminal of the capacitor and a second terminal of the second discharging switch is grounded;
a third discharging switch, wherein a first terminal of the third discharging switch is connected to the second terminal of the capacitor, and
a fourth discharging switch, wherein a first terminal of the fourth discharging switch is coupled to a second reference voltage;
a comparator, wherein a first comparison input terminal of the comparator is connected to a second terminal of the third charging switch and a second terminal of the fourth discharging switch, a second comparison input terminal of the comparator is connected to a second terminal of the fourth charging switch and a second terminal of the third discharging switch, and the comparator is configured to compare a voltage of the first comparison input terminal of the comparator with a voltage of the second comparison input terminal of the comparator to output a comparison signal; and
a controller circuit connected to an output terminal of the comparator, the charging switch circuit and the discharging switch circuit, and configured to receive the comparison signal from the comparator and then output the comparison signal, and output a control signal for controlling the charging switch circuit and the discharging switch circuit according to the comparison signal.

2. The dual-slope optical sensor according to claim 1, wherein the first comparison input terminal of the comparator is a non-inverting terminal, and the second comparison input terminal of the comparator is an inverting terminal.

3. The dual-slope optical sensor according to claim 1, wherein, when the controller circuit turns on the charging switch circuit and turns off the discharging switch circuit, the photocurrent flows to the capacitor through the first charging switch to charge a voltage of the capacitor to an initial voltage.

4. The dual-slope optical sensor according to claim 3, wherein the initial voltage is higher than a zero value and slightly lower than the second reference voltage.

5. The dual-slope optical sensor according to claim 4, wherein, when the photocurrent charges the capacitor such that the voltage of the capacitor is increased from the initial voltage to the first reference voltage, the controller circuit turns off the charging switch circuit and turns on the discharging switch circuit according to the comparison signal at a high level from the comparator.

6. The dual-slope optical sensor according to claim 5, wherein, when the controller circuit turns off the charging switch circuit and turns on the discharging switch circuit, the photocurrent flows to the capacitor through the first discharging switch such that the voltage of the capacitor gradually decreases.

7. The dual-slope optical sensor according to claim 6, wherein, when the voltage of the capacitor is decreased to reach the second reference voltage, the controller circuit turns on the charging switch circuit and turns off the discharging switch circuit.

8. The dual-slope optical sensor according to claim 1, further comprising: a current mirror, wherein an input terminal of the current mirror is connected to the optoelectronic component, and an output terminal of the current mirror is connected to the first terminal of the first charging switch and the first terminal of the first discharging switch.

9. The dual-slope optical sensor according to claim 8, wherein, the current mirror includes a first transistor and a second transistor, a first terminal of the first transistor and a first terminal of the second transistor are coupled to a common voltage, a second terminal of the first transistor is connected to a control terminal of the first transistor, a control terminal of the second transistor and a first terminal of the optoelectronic component, a second terminal of the optoelectronic component is grounded, and a second terminal of the second transistor is connected to the first terminal of the first charging switch and the first terminal of the first discharging switch.

10. The dual-slope optical sensor according to claim 9, further comprising:
   a current source connected to the output terminal of the current mirror and grounded.

* * * * *